(12) United States Patent
Borer et al.

(10) Patent No.: US 6,716,959 B2
(45) Date of Patent: Apr. 6, 2004

(54) DEVICE AND METHOD FOR TREATING PLASTIC MATERIAL

(75) Inventors: Camille Borer, Flurlingen (CH); Martin Mueller, Uzwil (CH); Filippo Terrasi, Niederuzwil (CH); Hans Geissbuehler, Zuzwil (CH)

(73) Assignee: Buehler AG, Schweiz (CH)

( * ) Notice: Subject to any disclaimer, the term of this patent is extended or adjusted under 35 U.S.C. 154(b) by 0 days.

(21) Appl. No.: 09/910,435

(22) Filed: Jul. 20, 2001

(65) Prior Publication Data

US 2002/0104232 A1 Aug. 8, 2002

Related U.S. Application Data

(63) Continuation of application No. PCT/CH00/00007, filed on Jan. 4, 2000.

(30) Foreign Application Priority Data

Jan. 22, 1999 (DE) .......................................... 199 02 458

(51) Int. Cl.[7] .......................... C08F 6/00; C08G 63/80; F26B 19/00; F26B 3/00; F26B 25/06
(52) U.S. Cl. ................. 528/483; 528/308.1; 528/308.2; 528/308.3; 528/480; 528/492; 528/502 R; 528/503; 34/168; 34/203; 34/206; 34/209; 34/282; 34/451; 34/498; 117/200; 422/245.1; 23/295 R
(58) Field of Search .......................... 528/308.1, 308.2, 528/308.3, 480, 483, 492, 502 R, 503; 117/200; 34/168, 203, 206, 209, 282, 451, 498; 422/245.1; 23/295 R

(56) References Cited

U.S. PATENT DOCUMENTS

| 3,404,098 | A | * | 10/1968 | Heighton et al. ............ 423/263 |
|---|---|---|---|---|
| 3,544,525 | A | | 12/1970 | Balint et al. ................... 260/75 |
| 3,756,990 | A | | 9/1973 | Jaeger et al. .................. 260/75 |
| 4,161,578 | A | | 7/1979 | Herron ........................ 528/272 |
| 4,226,973 | A | | 10/1980 | Malo et al. .................. 528/481 |
| 4,584,366 | A | | 4/1986 | Gerking et al. ............. 528/502 |
| 5,052,123 | A | | 10/1991 | Tischendorf et al. .......... 34/17 |
| 5,119,570 | A | | 6/1992 | Rüssemeyer et al. .......... 34/10 |
| 5,280,813 | A | * | 1/1994 | Jackson ....................... 141/286 |
| 5,409,672 | A | * | 4/1995 | Cetinkaya ................ 239/427.3 |
| 5,516,880 | A | | 5/1996 | Walsh ........................ 528/308 |
| 5,532,333 | A | * | 7/1996 | Stouffer et al. ........... 528/308.2 |
| 5,558,678 | A | * | 9/1996 | Weger ...................... 23/295 R |
| 5,714,571 | A | * | 2/1998 | Al Ghatta et al. ........ 528/308.2 |
| 5,797,989 | A | * | 8/1998 | Geissbuehler et al. ....... 117/200 |
| 5,830,982 | A | * | 11/1998 | Stouffer et al. .......... 528/308.3 |
| 6,010,667 | A | * | 1/2000 | Meyer et al. ................ 422/134 |
| 6,519,870 | B2 | * | 2/2003 | Becker et al. ................. 34/491 |

FOREIGN PATENT DOCUMENTS

| CH | 665 473 | 5/1988 |
| EP | 597 155 | 5/1994 |
| EP | 712 703 | 5/1996 |
| WO | WO 94/01484 | 1/1994 |

* cited by examiner

Primary Examiner—P. Hampton Hightower
(74) Attorney, Agent, or Firm—Darby & Darby

(57) ABSTRACT

The invention relates to a method for treating plastic material, especially polyethylene terephthalate, wherein the relatively low temperature material is initially crystallized by heating before subjecting said material to heating or condensation in the solid phase. The material is then exposed to a hot treatment gas for at least 10 minutes in at least two chambers (2) of an apparatus and crystallized at a temperature above 135° C., e.g. 140–180° C. The is subsequently heated in a preheating chamber (3) having at least one to eight stages at a temperature of at least 185° C., preferably at least 200° C. and more preferably around 220° C.

31 Claims, 3 Drawing Sheets

DEVICE AND METHOD FOR TREATING PLASTIC MATERIAL

This is a continuation of international application Ser. No. PCT/CH00/00007, filed Jan. 4, 2000, the entire disclosure of which is hereby incorporated by reference.

BACKGROUND OF THE INVENTION

1. Field of the Invention

The invention relates to a device for crystallizing plastic material as well as to a method for treating plastic material.

2. Description of Related Art and Summary of the Invention

Such a method has for example been disclosed in EP-A-0 712 703. When such a method is implemented in practical applications, the finished product has some significant deficiencies:

the product is hydrolysed, i.e. partly decomposed and thus its quality is insufficient;

the finished product contains a relatively high dust fraction which not only means loss of material but also increased cost per unit of weight of the end product; and the degree of crystallisation of the finished product is quite variable and the amorphous fraction is relatively high.

It is thus the object of the invention to create a product, e.g. bottle granulate made of PET or polyester material for tire cord etc., of improved quality with a low dust fraction and improved crystallinity. According to the invention this is achieved by the characterising portions of claim 1 or of claim 8.

The invention is based on the recognition that up to now, the production parameters have been selected in a somewhat carefree manner, with a bias to quick production. It has been found for example that slower heating during crystallisation with lower temperatures allows more gentle and economical production where in some cases even air can be used as a treatment medium instead of the normally used nitrogen.

It has also been found that the relatively high gas temperatures exceeding 195° C. hitherto applied not only lead to product decomposition and thus to a drop in quality, but also cause excessive heat loss in the apparatus hitherto used. It is for example known from U.S. Pat. No. 5,119,570 to carry out precrystallisation and crystallisation in separate apparatus. However, separate apparatus also means a relatively high surface-to-volume ratio which promotes heat loss. While in the above-mentioned EP-A, precrystallisation and crystallisation are carried out in a mutual device, this does not result in optimisation either.

From these findings, the device of the invention was developed which results in a compact and economical design which at the same time results in minimal heat loss. The small heat losses also result in the conditions of crystallisation being better able to be kept under control, so that from this point of view too, there is no compulsion to apply high treatment temperatures. There are above all advantages in that the gas throughput for the compartments from a single gas source can be smaller than was the case so far and in that the overall height of the device itself can be kept lower, thus resulting in savings of space and cost. While a crystalliser with a rotation-symmetrical housing is known from CH-A-665 473, it is not designed or suitable for carrying out precrystallisation and crystallisation, i.e. it requires an additional device for a separate crystallisation step.

In the above mentioned EP-A the path of the plastic material flowing through the device is such that a high throughput of air is required so as to generate an aggregate fluidisation, and that the material is thrown above a free space situated above a partition wall, into the next compartment. By contrast, the invention preferably provides for the path to meander by arranging free space or free spaces and discharge aperture(s) at various levels in longitudinal section through the treatment space. While the known throwing-over results in significant differences in dwell times of the individual material components, with the measure according to the invention there is better control over the dwell time. It has been shown that in this way an excellent crystallisation degree with negligible amorphous fraction can be achieved. By contrast, in the case of a meandering path, the quantity of air flowing through can be reduced. In addition, in the case of free spaces or apertures located at the bottom, there is a certain division of the treated material according to its density even in a fluidised bed, with material of increased relative density being more likely to be in the bottom region. While the differences in density between amorphous and crystallised material in the fluidised bed are not very large, the fact that the denser material near the bottom is already crystallised out to a larger degree than the material fluidising further up, does have some significance. Consequently, from the lower free spaces, predominantly the material which has undergone certain crystallisation progress, is conveyed to the next compartment (or to the discharge aperture).

According to the above-mentioned findings, the method according to the invention starts off at relatively low temperatures which treat the material gently. While at first this requires somewhat more time, it does however bring about the preconditions for material of improved quality. The time lost in comparison to that of the state of the art can be saved by the subsequent shorter treatment time during preheating or precondensation. Preferably a fluidised bed design is used, so that there is no need for any agitator devices within the treatment space (compare U.S. Pat. Nos. 4,064,112 and 4,161,578), for it has been shown that said agitator devices cause significant losses due to strong dust formation. It must be pointed out that separation of condensation into precondensation and postcondensation with different treatment conditions has already been disclosed in U.S. Pat. No. 3,756,990 and that it is also the preferred way of implementing the method according to the present invention. This is also reflected in the final temperature of the material of at least 185° C., preferably at least 200° C., in particular approx. 220° C.

In the aforesaid, among other things, the unevenness of the quality of the finished product has been criticised in the state of the art according to EP-A-0 712 703. Obviously the shortcomings of the crystallisation device that has been used, with random distribution of the dwell time, have been recognised in the state of the art which provides for subsequent heating in a container comprising rotating circulation devices. As has been found, it is precisely these circulation devices which are responsible for generating an excessive dust fraction. For this reason, with a view to a more gentle and controlled treatment of the material, the invention uses a different approach in that the crystallised material is brought into the shape of a rectangular bulk material stream of four-sided, in particular rectangular, cross-section of essentially even bulking across the cross-section; with treatment gas flowing from one side of the four-sided shape through said crystallised material. This means that as a result of this cross-sectional shape, the same conditions prevail for the gas along the entire inflow side, with the essentially even bulk density contributing its part. This can be improved still further in that the ratio of the rectangular sides of the cross-section of the bulk material stream is approximately 1:2 to 1:15, preferably ranging from 1:3 to 1:10, with the treatment gas being conducted through the bulk material stream from the larger side of the rectangle. In this way the method according to the invention differs from all those methods where the thicknesses of the bulk material stream and/or the gas flow conditions along the cross-section are different.

For gentle treatment, precrystallisation and crystallisation advantageously require a duration of between 10 and 80 minutes, preferably between 15 and 40 minutes, in particular between approx. 20 and 30 minutes. As mentioned above, according to the invention, subsequent heating up can be made more efficient by shortening this treatment step. According to the present invention this preferably takes place in that the heating following crystallisation, including precondensation, is carried out within a duration of 60 to 120 minutes, in particular approx. 90 minutes.

BRIEF DESCRIPTION OF THE DRAWINGS

Further details of the invention are provided by means of a preferred embodiment, diagrammatically shown in the drawing, as follows.

DETAILED DESCRIPTION OF THE PREFERRED EMBODIMENT

Figure 1:
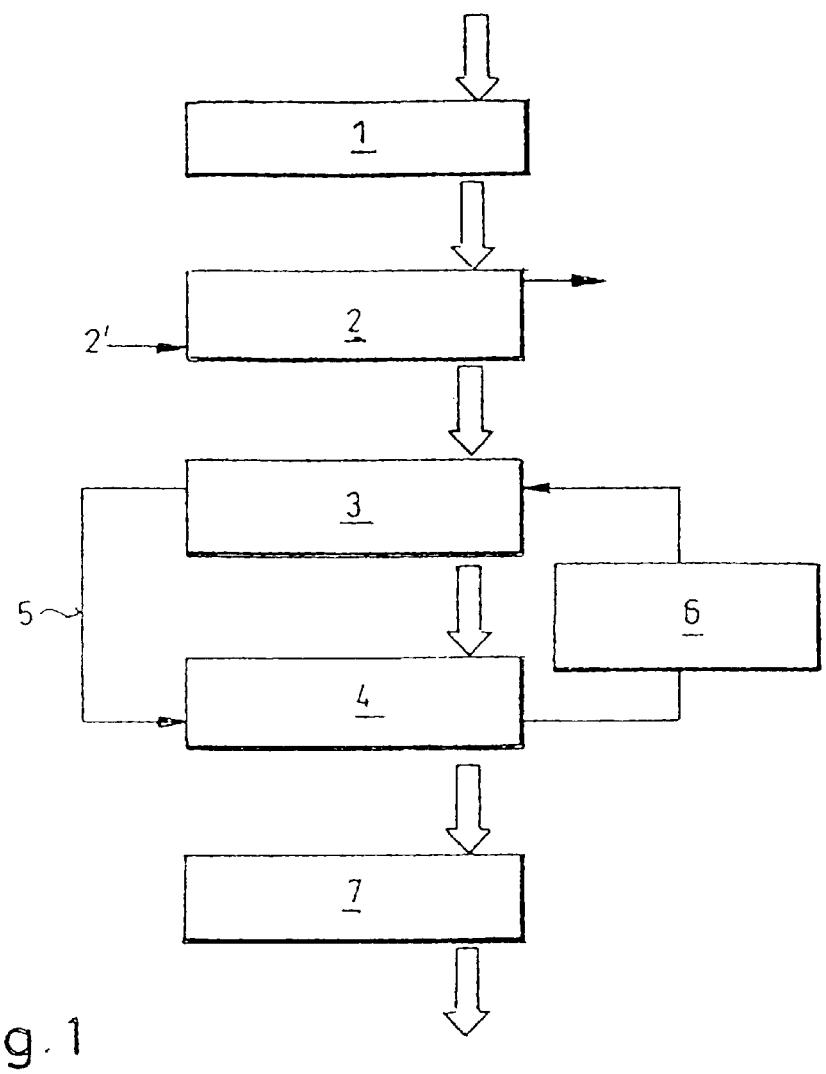
FIG. 1 is a flow chart of the method according to the invention.

According to FIG. 1 in a preliminary stage 1 of the method according to the invention, amorphous plastic granulate, in particular polyethylene terephthalate, is made, i.e. essentially extruded and cut into pellets. In the first stage of the process according to the invention, the amorphous plastic material produced in this way is fed to a crystalliser 2 which advantageously comprises precrystallisation and postcrystallisation, as is known from the state of the art but as will be explained below in FIGS. 2 and 3 by means of an embodiment according to the invention.

The plastic material is at approximately ambient temperature when it enters stage 2. Within stage 2, gas treatment with a hot inert gas takes place, such as nitrogen which is fed into a gas inlet 2' at a relatively low temperature (when compared to the state of the art) of approx. 165° C. to 185° C., e.g. 170° C. to 180° C. so as to achieve gentle treatment of the plastic material. Accordingly, it is better according to the invention if the dwell time in the crystalliser 2 is somewhat longer than is proposed in the state of the art, namely 10 to 80 minutes, preferably 20 to 40 minutes, in particular approx. 30 minutes. With the relatively low temperature and the relatively long dwell time an even and gentle treatment is achieved and it has been shown that with this method, practically complete crystallisation of the material can be achieved. Tests have shown that of the plastic material leaving stage 2, at the most 1% has remained amorphous, but generally less than that. Subsequently the final temperature of the plastic material is approx. 135° C. to 180° C. when it leaves stage 2.

The material heated to max. 180° C. must now continue to be heated so as to trigger a condensation reaction. Advantageously, a preheater 3 can be provided for this, followed by the actual reactor 4. As far as the gas circuit 5 (e.g. nitrogen) is concerned, the two stages are interconnected, with a gas purification stage 6 being inserted, before the gas which has passed through the circuit 5 once is again fed to the preheater 3.

The two-stages of the condensation method shown here are normal and advantageous, but not absolutely required. The diagram shown in FIG. 1 merely reflects the fact that it is advantageous if two devices 3 and 4, which are arranged in line, are provided. However, in practical application, preheating where the plastic material is heated to approx. 180° C. (if the material enters at a lower temperature than this) may be carried out separately in a heating device, with the condensation being carried out subsequently in one or several steps. For reasons of efficiency it is however more favourable if preheating and precondensation, and if required also condensation, are combined in one device. For example it would be imaginable to combine preheater or precondenser and condenser (reactor) in a single device. In this case it is advantageous to provide several gas inlets and outlets at various heights in the vertical reactor so as to divide said reactor into individual zones of different gas temperatures and/or gas quantities and/or speeds.

While the reactor 4 will be designed in the conventional way as a wall bed reactor or packed bed reactor with a tube, through which the plastic material passes at a controlled speed, a preferred embodiment of the preheater 3 will be described later by means of FIGS. 4 and 5. The "controlled speed" within reactor 4 mentioned, can be achieved by installing roof-like devices extending across the longitudinal axis. Such roof-like devices exert a braking effect on the material, thus preventing too rapid a flowthrough, but by their roof shape which converges to a point at the top, they promote separation of the individual particles which per se can have a definite tendency to stick together.

While the preheater 3 can be designed so as to be in one stage, it preferably comprises at least two stages, if necessary up to eight stages, with the gas temperature advantageously increasing from stage to stage. Depending on the design, at the end of the preheater 3, a material temperature of 190 to 235° C. will result. In the embodiment shown, which comprises the two stages 3 and 4, a material temperature of approx. 220° C. will be usual.

Subsequently, the reaction should be terminated as quickly as possible. For this purpose a cooling apparatus 7 is connected at the outlet side, with the postcondensed PET material subsequently issuing from said cooling apparatus 7. However, the material could also be a polyolefin, PEN or PA. If precooling takes place already at the end of the reactor 4, so that the plastic material issues at a temperature clearly below 185° C., for example at approx. 160° C., then it will no longer be necessary for the cooling apparatus 7 to be using inert gas; cooling with air will be possible.

Figure 3:
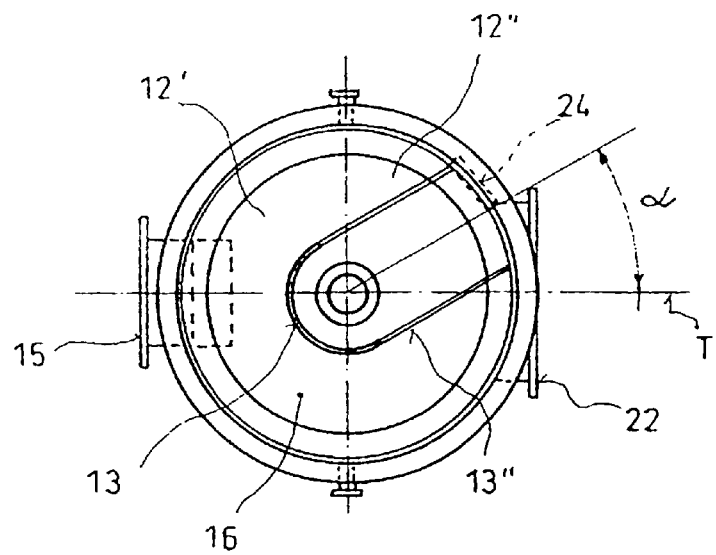
FIG. 3 shows a cross-section along the line III—III of FIG. 2.
Figure 2:
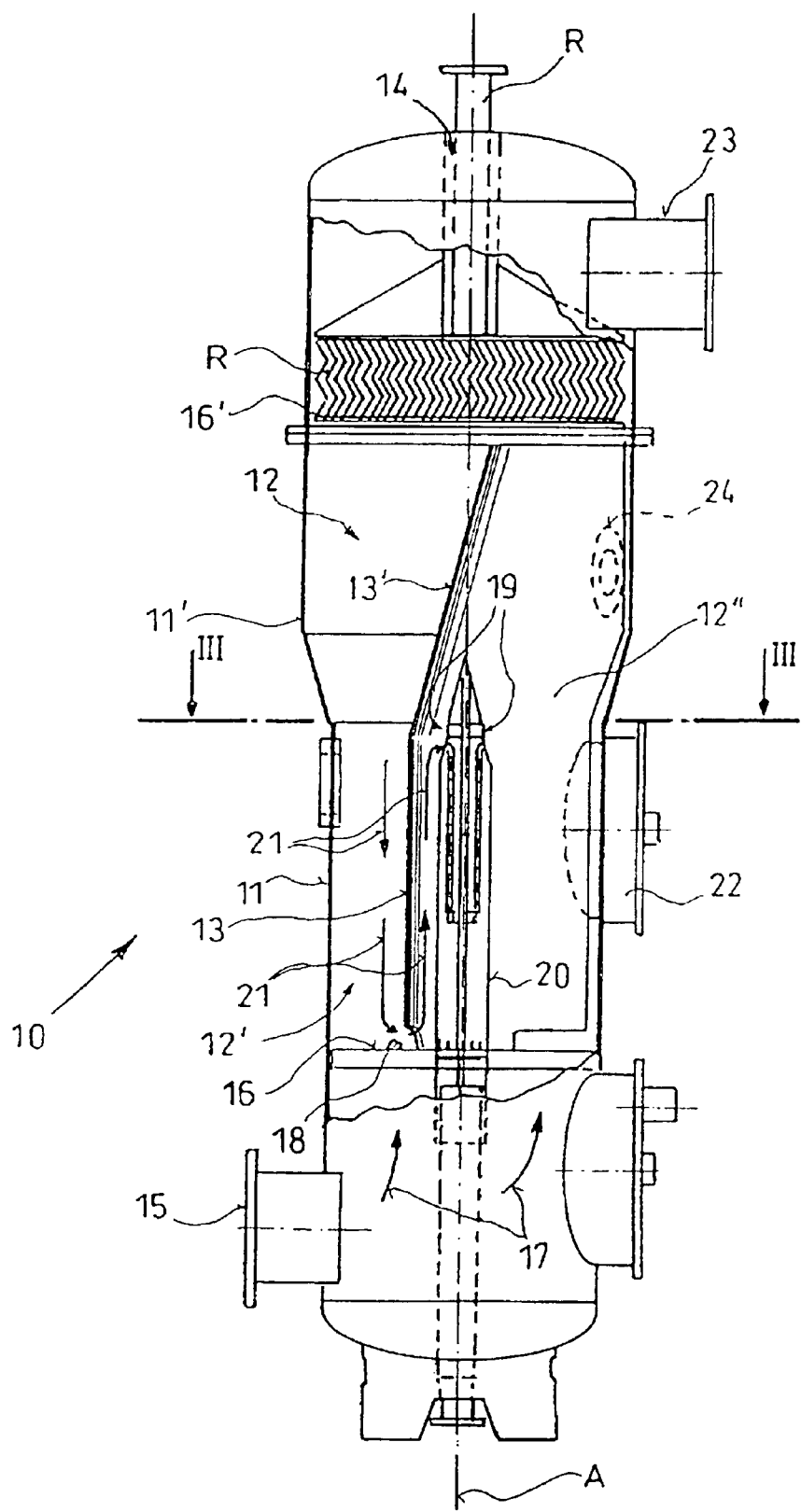
FIG. 2 shows a longitudinal section of an embodiment of a crystalliser for precrystallisation and postcrystallisation, according to the invention.

FIG. 2 shows a crystalliser 10 according to the invention which comprises a rotation-symmetrical, in particular cylindrical treatment space 12 (see FIG. 3), surrounded by walls 11, for accommodating the plastic material in the shape of pieces or pellets which issues from the preliminary stage 1 (FIG. 1). For control of precrystallisation with external drying-on of the pellets and crystallisation, said treatment space 12 is divided into at least two treatment compartments 12' and 12". This division is by a partition wall 13. FIG. 3 illustrates that the division is approximately sector-shaped, with the first treatment compartment 12' taking up at least approx. 50% of the cross-sectional area, preferably ⅔ to ¾ of the cross-section. By contrast, compartment 12" takes up the remainder of the available space. However, division per se (when seen in top view or in sectional view corresponding to FIG. 3) could also take place by means of radial division walls around the longitudinal axis A of the crystallisation apparatus 10. While the embodiment shown only shows two compartments 12', 12", if required, more than two compartments can be provided by at least one further partition wall.

The rotation-symmetrical design ensures a high volume-to-surface ratio, so that not only are heat losses minimal, but also an even temperature in the treatment room 12 is more easily assured. Plastic material can be fed to the treatment room 12 via at least one filling aperture 14. Within the filling aperture, a conventional rotor R for distributing the plastic material during entry in the treatment space can be provided via an upper floor 16'. Due to the relatively large volume of the compartment 12', or for space reasons, the wall 13 below preferably comprises a funnel-shaped deflection section 13' which also imparts increased rigidity to the wall. Thus, the plastic material slides down (to the left in FIG. 2) along section 13', into the first compartment or precrystallisation compartment 12".

Hot inert treatment gas such as nitrogen, flows through the treatment space 12. For this purpose a gas inlet nozzle 15 has been provided. The gas then flows upward according to the arrows 17, through a perforated floor 16. However, it is understood that as part of the invention it is quite possible to provide for at least two gas inlets 15 such that one of them admits gas only to compartment 12', and the other only to compartment 12". Such a divided gas supply makes it possible if necessary to treat the plastic material in the two compartments 12', 12" with differing gas quantities and/or gas speeds and/or gas temperatures. For example it might be advantageous to provide for a higher gas speed in compartment 12', to achieve faster drying of the surface of the plastic pellets. By contrast, in compartment 12" perhaps a lower speed but a higher temperature of the treatment gas is provided.

By providing for a relatively high flow rate of the gas, and for the treatment space 12 to become enlarged in an upper section 11' towards the top, both through the funnel section 13' and through an increase in diameter of the outer wall 11, the conditions for a so-called aggregate fluidisation bed are created in which the plastic material is very strongly fluidised. In this way, gas flows around the pellets on all sides and the surface of the pellets is dried. Amorphous pellets are somewhat lighter than completely crystallised pellets, and although the difference is not very great, it contributes to carrying out a selection of still amorphous and already partially crystallised material, if the transition from compartment 12' to compartment 12" is selected at the underside of the partition wall 13 where a passage 18 is shown in the drawing. It is understood that it can for example be advantageous if the partition wall 13 is connected to the floor 16 by means of downward protruding stays and if said partition wall 13 is supported by said floor 16, so that a number of such free spaces 18 are formed.

The height of the passage depends on the total volume of the treatment space 12, the degree to which said treatment space 12 is filled, and the type of material to be treated. It is thus quite possible within the scope of the invention, to provide for an adjustment device for the height of this free space 18, for example a slide gate which can be approximately slot shaped, delimiting the lower end of the partition wall 13. If necessary, the vertical position of the wall 13 is secured by radial spokes (not shown), in particular in the upper part of the treatment space, if need be also in the lower part. Generally, however, it has been shown that there is no need for an adjustment device for adjusting the height of the free space 18, and that this free space can be fixed. It has been shown that a gap height for the free space 18, of 3 to 8 cm, in particular around 5 cm is generally advantageous.

If it is to be possible to operate the crystalliser 10 continuously, as is preferred, an open discharge aperture 19 must always be provided, said discharge aperture 19 which according to FIG. 2 is located at the top of the crystallisation compartment 12" being provided in the end section of a discharge tube 20 which at its lower end discharges the material to the exterior. The location of the free space 18 below the partition wall 13, and the discharge aperture at the top, results in a somewhat meandering or switchback-like path according to the arrows 21 along which the plastic material must flow to travel from the feed aperture 14 to the discharge aperture 19. This not only increases the dwell time in the compartments but it also prevents any "shortcut" which would result if the material were able to pass directly from the free space 18 to a discharge aperture below. As the weight fraction of amorphous material has already dropped below half in compartment 12' (precrystallisation), now only a relatively short treatment in the second compartment 12" (postcrystallisation) is required in order to obtain almost 100% crystallisation. Therefore, this compartment 12" can be relatively small. A path according to arrows 21 will however also be advantageous if more than one partition wall 13 has been provided, in which case the material after the upward movement in compartment 12", could carry out a downward movement in a third compartment so that the discharge opening could advantageously be located in the floor region.

FIG. 3 shows a few geometric aspects of the design of the crystalliser 10. In top view the gas inlet 15 and a manhole 22 located opposite, result in a transverse axis T along which the gas outlet 23 is situated, as shown in a dot-dash line (in FIG. 2 situated above the sectional plane III—III). So as to provide access via a manhole 22 to both compartments 12' and 12", the compartment 12" is offset by a specified angle α in relation to the transverse axis T through the manhole 22. Said angle can range between 30° and 60° but is essentially not critical. For example 30° has proven advantageous because in such a way a geometric arrangement can be achieved in which the lower section 13" of the partition wall 13 in FIG. 3 is located approximately in the middle region of the manhole 22. Since the desired final condition of the plastic material is to be achieved in compartment 12", it is preferably associated with at least one monitoring device, for example a spectrometer "looking" into compartment 12", said spectrometer detecting the crystallisation state of the plastic by means of the spectrogram determined. But at the very least such a monitoring device can be realised in the shape of an inspection glass 24. Of course, such a monitoring device can already be provided in the preceding compartment, should this be desired.

Figure 4:
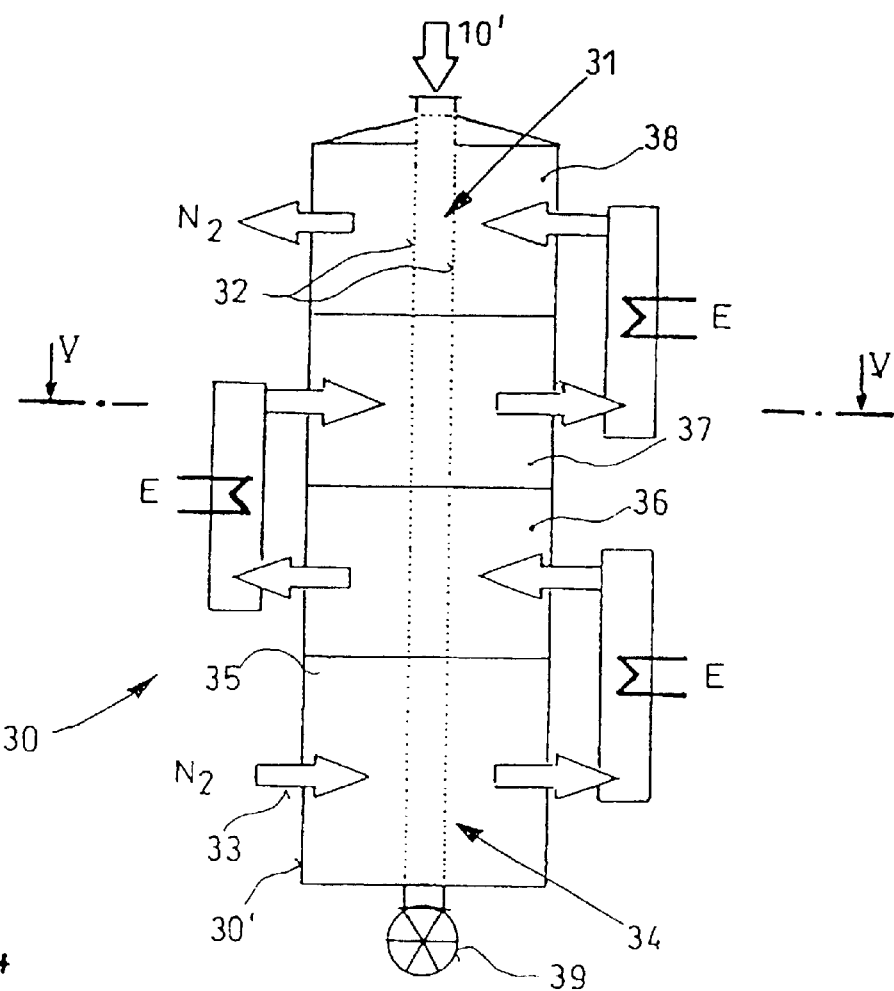
FIG. 4 is a diagrammatic drawing with a longitudinal section through a device preferably used according to the invention, for preheating and condensing as well as cooling.
Figure 5:
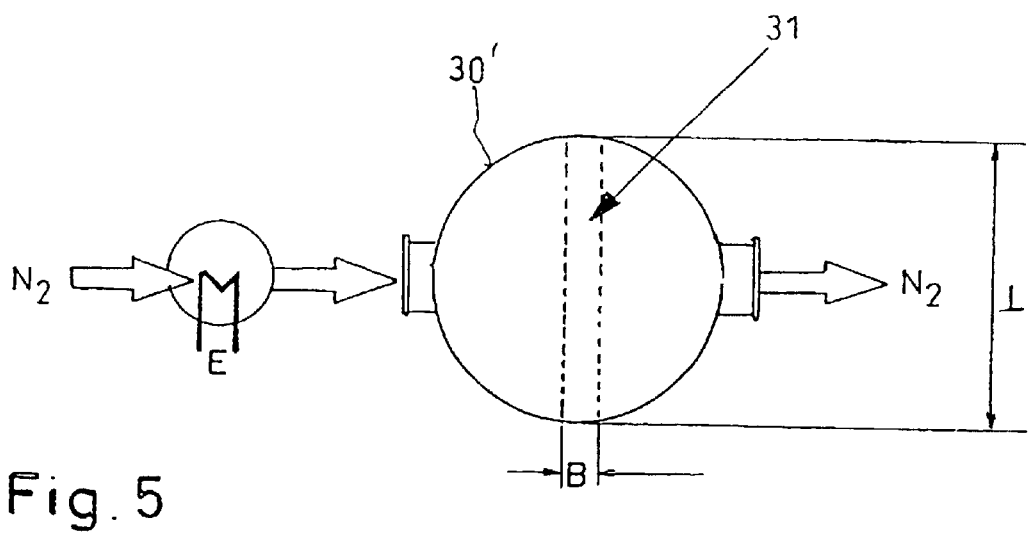
FIG. 5 shows a cross-section of the above-mentioned device according to line V—V of FIG. 4.

After passing through the crystalliser (stage 2 in FIG. 1), as shown in the diagram, the plastic material reaches a preheater 3, a preferred embodiment of which is shown in FIGS. 4 and 5. The arrow 10' in FIG. 4 indicates that at this stage the material emanating from the crystalliser 10 enters the feed aperture of a shaft 31 of the preheater (precondenser) 30. Within an exterior wall 30' approximately circular in shape, the shaft 31 is of rectangular cross-section, as can be seen in particular in FIG. 3. The ratio of length L to width B is for example approximately 1:3 to 1:10, preferably 1:5 to 1:8, in particular around 1:6. The shaft 31 is delimited on both sides by means of perforated plates, sieves or similar 32. This ensures even flow conditions and treatment conditions along the entire length L. In addition, the vertical arrangement of the shaft 31 leads to even density of the material across the entire cross-section of the shaft.

As is shown, the device 30 which can generally be called a heat exchanger is divided into several stages with different functions. If for example $N_2$ is used as an inert gas for treatment, said gas can enter at 33 at a relatively low temperature in order to bring the treated goods in a compartment 34 separated by an upper wall 35, to a lower temperature or to expel volatile compounds which were released in one of the upper compartments.

After the nitrogen in compartment 34 has streamed through the sieve walls 32 of the shaft 31, it leaves this cooling compartment 34 and is subsequently brought to a higher temperature by an electrical heating device E. In this, a temperature for example of at least 185° C. is reached which serves as a holding temperature for precondensation in a compartment 36. Here again the gas streams in a zigzag through the shaft 31, i.e. in the opposite direction to the flow in compartment 34 below, so as to subsequently again be further heated in a heating device E and to pass through a precondensation compartment 37 where the plastic material is for example treated at a gas temperature between 200° C. and 240° C., if required up to 260° C. Again, the direction of flow in this compartment 37 is opposite to that in the adjacent compartment 36. Subsequently, in the uppermost compartment 38 after renewed heating, if required the highest temperature is reached for preheating the plastic material which is still at a lower temperature. However, this is not absolutely essential, for the temperature management can also be selected such that in the last, uppermost heating device E, only the temperature losses in the compartment 36 situated below are compensated for. In this way the treatment gas essentially flows upwards, while the plastic material sinks in the shaft 31, thus moving in reverse flow. The rate of fall in the shaft 31 can be controlled by controlled discharge at the lower end, for example by means of a cellular wheel sluice 39 with variable speed or e.g. by way of temperature sensors at the end of the shaft 31. It is understood that if required more than four compartments, e.g. six or eight or fewer, or even only one compartment can be provided, depending on the tasks assigned to the heat exchanger 30, such as only preheating, precondensation, condensation etc. Nor is it necessary for the gas to be led in a zigzag path, but instead, separate gas inlets may be provided for individual compartments, for example to vary the quantity of flow, the type of gas and/or the gas speed in the individual compartments 34 to 38.

What is claimed is:

1. A device for crystallising plastic material, comprising a treatment space (12) for accommodating the plastic material in the shape of pieces or pellets, said treatment space (12) being able to be charged with plastic material via at least one feed aperture (14) and discharged by at least one discharge aperture (19); a feed device (15) for a treatment gas via a floor region (16) of the treatment space (12) and at least one upright partition wall (13) provided in the treatment space (12) for dividing the treatment space (12) into at least two compartments (12', 12") which are interconnected via a free space (18) near a bottom of said partition for conveying the plastic material from one compartment (12', 12") to another compartment (12', 12") so that from the feed aperture (14) to the discharge aperture (19) the plastic material passes in opposite directions in two compartments along a predefined, substantially vertical path (21); wherein the two compartments (12', 12") are provided in an at least approximately rotationally-symmetrical housing (11).

2. A device according to claim 1, wherein due to the arrangement of free space or the free spaces (18) and the discharge opening (19) in the path (21) at different levels, the path zigzags or meanders through the treatment space.

3. A device according to claim 1 or 2, wherein at least one free space (18) is provided at the bottom of the associated partition wall (13), and that the discharge aperture (19) is provided near a top of the subsequent compartment (12").

4. A device according to claims 1 or 2, wherein a partition wall (13) is provided below the feed aperture (14), for deflecting the incoming plastic material by means of a funnel section (13'), so as to deflect the material to a preceding compartment (12'), thus at least partially covering the subsequent compartment (12") by the funnel section (13').

5. A device according to claims 1 or 2, wherein the first compartment (12') takes up more than half of the area in top view of the treatment space (12) which is at least approximately ratationally-symmetrical, and that this first compartment (12') is followed by a second compartment (12") which is accordingly smaller.

6. A device according to claims 1 or 2, wherein a monitoring arrangement such as an inspection glass (24) is associated with at least one compartment (12").

7. A device according to claims 1 or 2, wherein the floor region of the treatment space (12) is the perforated floor (16) of a fluidised bed.

8. A method for treating plastic material in which the material which has a relatively low temperature is first crystallised during heating before said material is led to heating or condensation in a solid phase, in particular using a device according to claim 1 wherein the material is exposed to hot treatment gas for at least 10 minutes in at least two spaces (12', 12") and thus for crystallisation is heated to a temperature exceeding 135° C., and that said material subsequently, in a preheating space (31) comprising up to eight stages, is heated to a temperature of at least 185° C.

9. A method according to claim 8, wherein the hot treatment gas is admitted during crystallisation at a temperature of 165 to 185 degrees C.

10. A method according to claim 8 or 9, wherein for evening out the treatment and thus the product quality, the crystallised material is brought into the shape of a bulk material stream of four-sided cross-section of essentially even bulking across the cross-section, with treatment gas flowing from one side (L) of the four-sided cross-section.

11. A method according to claim 10 wherein the ratio of the rectangular sides (B:L) of the cross-section of the bulk material stream is approximately 1:2 to 1:15 with the treatment gas being conducted through the bulk material stream from the larger side of the rectangle (L).

12. A method according to claim 10 or 11, wherein the treatment gas is applied to one side (L) of the four-sided cross-section in at least two stages, each of increased temperature.

13. A method according to claim 12, wherein the treatment gas is conveyed in reverse flow from a first stage (34–37) having a first temperature to a second stage (35–38) of a higher temperature than the first temperature.

14. A method according to claim 12 or 13, wherein the treatment gas is conveyed, in a zigzagging or meandering way, several times through the four-sided cross-section of the bulk material in at least three stages (34–37 or 35–38).

15. A method according to claim 12 or 13, wherein the bulk material of four-sided cross-section is conveyed essentially vertically, and that the treatment gas is conveyed essentially horizontally through the four-sided cross-section.

16. A method according to one of claims 8, 9, 12 or 13, wherein precrystallisation and crystallisation are preferably carried out within a duration of 10 to 80 minutes.

17. A method according to one of claims 8, 9, 12 or 13, wherein heating following crystallisation, including precondensation, takes place within a duration of 60 to 120 minutes.

18. A device according to claim 6 wherein at least one compartment is the last compartment.

19. A method of claim 8 wherein the material is heated to temperature of approximately 140°–180° for crystallization.

20. A method of claim 8 wherein the pre-heating space comprises at least two stages.

21. A method of claim 8 wherein the material in the pre-heating space is heated to a temperature of at least 200° C.

22. The method of claim 21 wherein the material in the pre-heating space is heated to a temperature of approximately 220° C.

23. The method of claim 11 wherein the ratio of the rectangular sides is in the range 1:3 to 1:10.

24. A method of claim 16 wherein the duration is between 15 and 40 minutes.

25. A method of claim 24 wherein the duration is between 20 and 30 minutes.

26. The method of claim 17 wherein the duration is approximately 90 minutes.

27. The device of claim 1 wherein the crystallising plastic material is polyethylene terephthalate.

28. The device according to claim 5 wherein the first compartment takes up more than ⅔ of the area in top view of the treatment space.

29. The method according to claim 8, wherein the plastic material is polyethylene terephthalate.

30. The method according to claim 8 or 9, wherein the cross-section is rectangular.

31. The method according to claim 12, wherein the treatment gas is applied to an opposite side of the four-sided cross-section.

* * * * *